United States Patent [19]

Imashiro et al.

[11] Patent Number: 5,436,278
[45] Date of Patent: Jul. 25, 1995

[54] MELAMINE RESIN FOAM, PROCESS FOR PRODUCTION THEREOF AND MELAMINE/FORMALDEHYDE CONDENSATE

[75] Inventors: Yasuo Imashiro; Shun Hasegawa; Tatsuya Okutani, all of Tokyo, Japan

[73] Assignee: Nisshinbo Industries, Inc., Tokyo, Japan

[21] Appl. No.: 350,477

[22] Filed: Dec. 7, 1994

[30] Foreign Application Priority Data

Dec. 7, 1993 [JP] Japan .................................. 5-340467

[51] Int. Cl.⁶ ........................ C08J 9/14; C08G 18/84
[52] U.S. Cl. ........................ 521/187; 521/91; 521/94; 521/110; 521/128; 521/158
[58] Field of Search ............... 521/110, 128, 158, 94, 521/91, 187

[56] References Cited

U.S. PATENT DOCUMENTS

| | | | |
|---|---|---|---|
| 4,176,217 | 11/1979 | Golser et al. | 521/188 |
| 4,334,971 | 6/1982 | Mahnke et al. | 204/159.21 |
| 4,640,935 | 2/1987 | Fisk et al. | 521/145 |
| 5,118,722 | 6/1992 | Wollmann et al. | 521/188 |

FOREIGN PATENT DOCUMENTS 53-17697  2/1978  Japan .
2-50943B2  11/1990  Japan .

*Primary Examiner*—Morton Foelak
*Attorney, Agent, or Firm*—Ronald J. Kubovcik

[57] ABSTRACT

The present invention provides:

a melamine resin foam obtained by foaming a resin composition comprising a melamine/formaldehyde condensate, a blowing agent and an isocyanate, a process for producing the above melamine resin foam, which comprises foaming a resin composition comprising a melamine/formaldehyde condensate, a blowing agent and an isocyanate, and a melamine/formaldehyde condensate used in the production of the above melamine resin foam, which is obtained by reacting melamine and formaldehyde in the presence of a silane coupling agent.

The melamine resin foam of the present invention is free from the problems of the prior art, has solved the problem of fragility without impairing the good flame retardancy and low thermal conductivity inherently possessed by melamine resin foams, and causes no danger during the production.

4 Claims, No Drawings

MELAMINE RESIN FOAM, PROCESS FOR PRODUCTION THEREOF AND MELAMINE/FORMALDEHYDE CONDENSATE

BACKGROUND OF THE INVENTION (1) Field of the Invention

The present invention relates to a melamine resin foam, a process for production thereof, and a melamine/formaldehyde resin suitably used in the production of said melamine resin foam.

(2) Description of the Prior Art

Melamine resin foams are produced from a resin composition comprising, as main components, a melamine/formaldehyde resin (which is a thermosetting resin obtained by the reaction of melamine and formaldehyde) and a blowing agent. Among organic resin foams, melamine resin foams show excellent flame retardancy and are regarded to be useful particularly as a heat insulating construction material. The melamine resin foams, however, are very fragile generally with the fragility being conspicuous in the case of highly expanded foams, causing cracking. Hence, the melamine resin foams see no practical application yet in spite of their excellent flame retardancy mentioned above.

For the realization of the practical application of melamine resin foams, many researches have been made. For example, in Japanese Patent Application Kokai (Laid Open) No. 17697/1978 is disclosed a process for producing a melamine resin foam by adding, to a melamine/formaldehyde condensate, 12%–330% by weight, based on the resin, of an isocyanate and giving rise to foaming in the presence of a catalyst using no blowing agent. However, addition of such a large amount of an isocyanate produces a melamine resin foam of low flame retardancy.

Further in Japanese Patent Publication No. 50943/1990 is disclosed a process for producing an elastic foam (which uses a melamine/formaldehyde condensate as a basic material and which is free from problems of fragility and flame retardancy and has good properties) by applying an ultrahigh frequency to a solution comprising a melamine/formaldehyde precondensate, a blowing agent and other substances.

As well known, when an ultrahigh frequency is applied to a metal, discharge takes place. The above solution comprising a melamine/formaldehyde precondensate, a blowing agent and other substances contains, in most cases, a combustible solvent (in the above Japanese Patent Publication No. 50943/1990, there are mentioned, as the blowing agent used, hydrocarbons, alcohols, etc.). In this connection, if the above solution containing a melamine/formaldehyde precondensate, a blowing agent and other substances contains a metal, the application of an ultrahigh frequency to the solution causes discharge and quite possibly allows the solution to catch a fire. Thus, the process disclosed in Japanese Patent Publication No. 50943/1990 is not suitable at least for use on industrial scale.

OBJECT AND SUMMARY OF THE INVENTION

In view of the above mentioned problems of the prior art, the object of the present invention is to produce a melamine resin foam which has solved the problem of fragility without impairing the good flame retardancy and low thermal conductivity inherently possessed by melamine resin foams and which causes no danger during the production; a process for production of such a melamine resin foam; and a melamine/formaldehyde condensate used in the production of said melamine resin foam.

The present inventors used, in foaming and curing a melamine/formaldehyde condensate, a small amount of an isocyanate (in place of a large amount of an isocyanate in the above mentioned prior art) together with a blowing agent and, as a result, found out that the resulting melamine resin foam is improved in the fragility, particularly compression strain inherently possessed by melamine resin foams and that the foam gives very small reductions in flame retardancy and thermal conductivity as compared with conventional melamine resin foams. As a result of further research, the present inventors found out that the use as the melamine/formaldehyde condensate, of a silicon containing melamine/formaldehyde obtained by using a silane coupling agent in the synthesis can produce a melamine resin foam of improved compression stress with other properties being substantially unchanged. The above finding has led to the completion of the present invention.

According to the present invention there are provided:

a melamine resin foam obtained by foaming a resin composition comprising a melamine/formaldehyde condensate, a blowing agent and an isocyanate, a process for producing the above melamine resin foam, which comprises foaming a resin composition comprising a melamine/formaldehyde condensate, a blowing agent and an isocyanate, and a melamine/formaldehyde condensate used in the production of the above melamine resin foam, which is obtained by reacting melamine and formaldehyde in the presence of a silane coupling agent.

DETAILED DESCRIPTION OF THE INVENTION

The present invention is described in detail below.

As mentioned above, the melamine resin foam of the present invention is obtained by foaming a resin composition comprising a melamine/formaldehyde condensate, a blowing agent and an isocyanate. Description is made first on the components used in the production of said melamine resin foam.

The melamine/formaldehyde condensate is obtained, for example, by mixing melamine, formalin and paraformaldehyde and reacting them in the presence of an alkali catalyst with heating. In this case, the mixing ratio of melamine and formaldehyde is, for example, 1:3 by a molar ratio. The viscosity of the melamine/formaldehyde condensate is preferably 1,000–100,000 cP, particularly preferably 5,000–15,000 cP, for example. The pH of the melamine/formaldehyde is preferably 8–9, for example.

The blowing agent added to the above melamine/formaldehyde condensate is preferably a straight chain alkyl hydrocarbon (e. g. pentane or hexane) or a lower alcohol (particularly, a lower alcohol of up to 6 carbon atoms), for example.

The isocyanate used in the present invention is not particularly restricted as long as it is easily available, and can be exemplified by CR 200 (a trademark of polymeric-4,4'-diphenylmethanediisocyanate, produced by Mitsui Toatsu Chemicals, Inc.) and Sumidur E211, E212 and L (trademarks of MDI type prepolymers, produced by Sumitomo Bayer Urethane Co., Ltd).

The isocyanate preferably has NCO equivalents of 125–500. When the NCO equivalents are smaller than the above lower limit, the soft segment portion relative to the reactive portion is small, resulting in small improvement infragility. When the NCO equivalents are larger than the above upper limit, the improvement in fragility is obtained but the flame retardancy of the resulting melamine resin foam is low.

In the present invention, the content of the isocyanate is preferably 0.5–20 parts by weight, particularly preferably 5–10 parts by weight per 100 parts by weight of the melamine/formaldehyde condensate. When the content of the isocyanate is too low, there is obtained no sufficient effect by addition of the isocyanate. When the content is too high, the unreacted NCO remains in a large amount.

The resin composition comprising the above components, used for production of the melamine resin foam of the present invention can further comprise various additives. An example of the additives is an emulsifier represented by sodium dodecylbenzenesulfonate.

In order to foam and cure the above resin composition to obtain a melamine resin foam, there can be used, for example, an ordinary acidic curing agent. Examples of the acidic curing agent are acids such as formic acid, hydrochloric acid, sulfuric acid and the like.

The melamine resin foam of the present invention can be produced, for example, by placing, in an appropriate mold, a resin composition comprising the melamine/formaldehyde condensate, blowing agent, isocyanate and, as necessary, additives and acidic curing agent all mentioned above and heating the composition to give rise to foaming.

The melamine resin foam of the present invention which typically had a density of 25–100 kg/m³ had not only a compression strain by JIS K 7220, of 2.7%–4.2% (this is improved by about 40%–130% over the value (1.9%) of conventional fragile melamine foams) but also a change in thermal conductivity between 10°–55° C., of 0.005 kcal/mh°C. or less (this is far smaller than 0.01 kcal/mh°C. which is the value of conventional fragile foam). The present melamine resin foam was also examined for flame retardancy by oxygen index, which was about the same as those of conventional fragile foams, and free from lowering of flame retardancy observed in a conventional melamine foam obtained by adding a large amount of an isocyanate to improve the fragility.

In the present invention, it is possible to use, as the melamine/formaldehyde condensate, a melamine/formaldehyde condensate obtained by reacting melamine and formaldehyde in the presence of a silane coupling agent.

It is known that silane coupling agents give rise to a reaction represented by the following formula (1) in an aqueous solution:

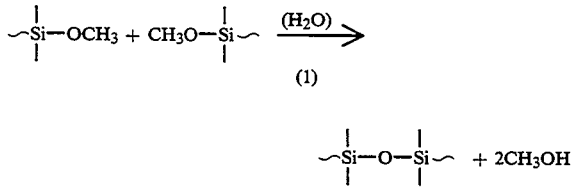

and that they also give rise to a reaction represented by the following formula (2) with a hydroxyl group:

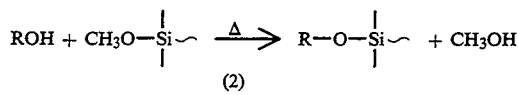

The silane coupling agent used in the present invention is not particularly restricted as long as it is represented by a general formula RSi(OCH₃)₃ or RSi(OCH₂CH₃)₃. Specific examples thereof are KBE 403 (a trade name of 7-glycidoxypropyltrimethoxysilane), KBE 402 (a trade name of γ-glycidoxypropylmethyldiethoxysilane), KBM 603 [a trade mane of N-β-(aminoethyl)-7-aminopropylmethyldiethoxysilane], KBM 602 [a trade name of N-(β-(aminoethyl)-γ-aminopropyltrimethoxysilane] (all of these are products of Shin-Etsu Chemical Co., Ltd.).

The silane coupling agent can be dropwise added to, for example, a reaction system where melamine and aldehyde are reacted for synthesis of a melamine/formaldehyde condensate, whereby can be formed a silicon modified melamine/formaldehyde condensate which is uniform.

It is thought that the silane coupling agent reacts with the methylol group formed by the addition of aldehyde during the synthesis of a melamine/formaldehyde condensate and thereby is taken into the terminal of the melamine/formaldehyde condensate and that the resulting silicon-modified melamine/formaldehyde condensate causes, during its foaming, a cross linking reaction as shown by the above formula (1), to form a foam of improved compression stress.

When the silicon modified melamine/formaldehyde condensate is used, the amount of the silane coupling agent used is preferably 0.5–15 parts by weight per 100 parts by weight of the silicon modified melamine/formaldehyde condensate. In this case, the other components and the process for production of a melamine resin foam are the same as in the case of using the silicon unmodified melamine/formaldehyde condensate mentioned above.

The melamine resin foam obtained using the silicon modified melamine/formaldehyde condensate, typically had about the same density, change in thermal conductivity between 10°–55° C. and compression strain as those of the melamine resin foam of the present invention obtained using the silicon unmodified melamine/formaldehyde condensate, and had a compression stress by JIS K 7220 improved by 50%–200% over conventional melamine resin foams. The melamine resin foam was also examined for flame retardancy by oxygen index, which was nearly the same as those of conventional fragile melamine foams.

The present invention is hereinafter described specifically by way of Examples and Comparative Examples.

In the following Examples and Comparative Examples, the melamine/formaldehyde condensate used was produced by mixing melamine and formaldehyde at a molar ratio of 1:3 with an adjustment made so as to give solid portion of 80%, adding 2 N of sodium hydroxide as a catalyst, then conducting a reaction at 120° C. for 50 minutes, and making a final adjustment so as to give a resin content of 76% and a viscosity of 12,000 cP; and the silicon modified melamine/ formaldehyde condensate used was produced by mixing melamine and formaldehyde at a molar ratio of 1:3 with an adjustment made so as to give a resin content of 80%, adding 2 N of sodium hydroxide as a catalyst, then conducting a reaction at 120° C. for 50 minutes, 10 minutes thereafter adding a silane coupling agent by drops, and 30 minutes thereafter completing the whole reaction. The flame retardancy of each foam was measured by oxygen index by JIS K 7201.

Example 1

| | |
|---|---|
| Melamine/formaldehydecondensate (76%) | 100 parts by weight |
| Sodium dodecylbenzenesulfonate (30%) | 6.3 parts by weight |
| Pentane | 7.6 parts by weight |
| Ammonium chloride | 9.5 parts by weight |
| Formic acid | 2.7 parts by weight |
| CR 200 | 7.6 parts by weight |

Ammonium chloride, sodium dodecylbenzenesulfonate, pentane and formic acid were added to a melamine/formaldehyde condensate in the above proportions. Thereto was added CR 200, and the mixture was stirred for about 20 seconds. 55 g out of the resulting resin composition was placed in a mold of 20×20×2.5 cm and was foamed in an oven of 100° C. In this case, the mold was heated to 100° C. beforehand. The resulting foam had the following properties.

| | |
|---|---|
| Density | 41 kg/m$^3$ |
| Compression stress | 0.22 kgf/cm$^2$ |
| Compression strain | 2.7% |
| Oxygen index | 30% |
| Thermal conductivity | 2.63 × 10$^{-2}$ kcal/mh°C. (10° C.) |
| | 2.68 × 10$^{-2}$ kcal/mh°C. (25° C.) |
| | 2.90 × 10$^{-2}$ kcal/mh°C. (55° C.) |

EXAMPLE 2

| | |
|---|---|
| Melamine/formaldehyde condensate (76%) | 100 parts by weight |
| Sodium dodecylbenzenesulfonate (30%) | 6.3 parts by weight |
| Pentane | 11.4 parts by weight |
| Ammonium chloride | 9.5 parts by weight |
| Formic acid | 2.7 parts by weight |
| CR 200 | 7.6 parts by weight |

Ammonium chloride, sodium dodecylbenzenesulfonate, pentane and formic acid were added to a melamine/formaldehyde condensate in the above proportions. Thereto was added CR 200, and the mixture was stirred for about 20 seconds. 45 g out of the resulting resin lo composition was placed in a mold of 20×20×2.5 cm and was foamed in an oven of 100° C. In this case, the mold was heated to 100° C. beforehand. The resulting foam had the following properties.

| | |
|---|---|
| Density | 26.8 kg/m$^3$ |
| Compression stress | 0.23 kgf/cm$^2$ |
| Compression strain | 2.7% |
| Oxygen index | 30% |
| Thermal conductivity | 2.60 × 10$^{-2}$ kcal/mh°C. (10° C.) |
| | 2.73 × 10$^{-2}$ kcal/mh°C. (25° C.) |
| | 2.88 × 10$^{-2}$ kcal/mh°C. (55° C.) |

EXAMPLE 3

| | |
|---|---|
| Melamine/formaldehyde condensate (76%) | 100 parts by weight |
| Sodium dodecylbenzenesulfonate (30%) | 6.3 parts by weight |
| Pentane | 15.2 parts by weight |
| Ammonium chloride | 9.5 parts by weight |
| Formic acid | 2.7 parts by weight |
| CR 200 | 7.6 parts by weight |

Ammonium chloride, sodium dodecylbenzenesulfonate, pentane and formic acid were added to a melamine/formaldehyde condensate in the above proportions. Thereto was added CR 200, and the mixture was stirred for about 20 seconds. 45 g out of the resulting resin composition was placed in a mold of 20×20×2.5 cm and was foamed in an oven of 100° C. In this case, the mold was heated to 100° C. beforehand. The resulting foam had the following properties.

| | |
|---|---|
| Density | 26.8 kg/m$^3$ |
| Compression stress | 0.16 kgf/cm$^2$ |
| Compression strain | 2.8% |
| Oxygen index | 30% |
| Thermal conductivity | 2.64 × 10$^{-2}$ kcal/mh°C. (10° C.) |
| | 2.71 × 10$^{-2}$ kcal/mh°C. (25° C.) |
| | 2.90 × 10$^{-2}$ kcal/mh°C. (55° C.) |

EXAMPLE 4

| | |
|---|---|
| Melamine/formaldehyde condensate (76%) | 100 parts by weight |
| Sodium dodecylbenzenesulfonate (30%) | 6.3 parts by weight |
| Pentane | 7.6 parts by weight |
| Ammonium chloride | 9.5 parts by weight |
| Formic acid | 2.7 parts by weight |
| Sumidur E211 | 7.6 parts by weight |

Ammonium chloride, sodium dodecylbenzenesulfonate, pentane and formic acid were added to a melamine/formaldehyde condensate in the above proportions. Thereto was added Sumidur E211, and the mixture was stirred for about 20 seconds. 40 g out of the resulting resin composition was placed in a mold of 20×20×2.5 cm and was foamed in an oven of 100° C. In this case, the mold was heated to 100° C. beforehand. The resulting foam had the following properties.

| | |
|---|---|
| Density | 31.0 kg/m$^3$ |
| Compression stress | 0.24 kgf/cm$^2$ |
| Compression strain | 4.0% |
| Oxygen index | 30% |
| Thermal conductivity | 2.70 × 10$^{-2}$ kcal/mh°C. (10° C.) |
| | 2.87 × 10$^{-2}$ kcal/mh°C. (25° C.) |
| | 3.00 × 10$^{-2}$ kcal/mh°C. (55° C.) |

EXAMPLE 5

| | |
|---|---|
| Melamine/formaldehyde condensate (76%) | 100 parts by weight |
| Sodium dodecylbenzenesulfonate (30%) | 6.3 parts by weight |
| Pentane | 11.4 parts by weight |
| Ammonium chloride | 9.5 parts by weight |
| Formic acid | 2.7 parts by weight |
| Sumidur E211 | 7.6 parts by weight |

Ammonium chloride, sodium dodecylbenzenesulfonate, pentane and formic acid were added to a melamine/formaldehyde condensate in the above proportions. Thereto was added Sumidur E211, and the mixture was stirred for about 20 seconds. 50 g out of the resulting resin composition was placed in a mold of 20×20×2.5 cm and was foamed in an oven of 100° C. In this case, the mold was heated to 100° C. beforehand. The resulting foam had the following properties.

| | |
|---|---|
| Density | 41.9 kg/m$^3$ |
| Compression stress | 0.33 kgf/cm$^2$ |
| Compression strain | 4.2% |
| Oxygen index | 30% |
| Thermal conductivity | 2.60 × 10$^{-2}$ kcal/mh°C. (10° C.) |
| | 2.75 × 10$^{-2}$ kcal/mh°C. (25° C.) |
| | 2.92 × 10$^{-2}$ kcal/mh°C. (55° C.) |

Comparative Example 1

| | |
|---|---|
| Melamine/formaldehyde condensate (76%) | 100 parts by weight |
| Sodium dodecylbenzenesulfonate (30%) | 6.3 parts by weight |
| Pentane | 7.6 parts by weight |
| Ammonium chloride | 9.5 parts by weight |
| Formic acid | 2.7 parts by weight |

Ammonium chloride, sodium dodecylbenzenesulfonate, pentane and formic acid were added to a melamine/formaldehyde condensate in the above proportions. 45 g out of the resulting resin composition was placed in a mold of 20×20×2.5 cm and was foamed in an oven of 100° C. In this case, the mold was heated to 100° C. beforehand. The resulting foam had the following properties. Incidentally, the thermal conductivity at 10° C. could not be measured because the foam had cracks and caused breakage.

| | |
|---|---|
| Density | 29.1 kg/m$^3$ |
| Compression stress | 0.34 kgf/cm$^2$ |
| Compression strain | 1.9% |
| Oxygen index | 31% |
| Thermal conductivity | 2.63 × 10$^{-2}$ kcal/mh°C. (25° C.) |
| | 2.95 × 10$^{-2}$ kcal/mh°C. (55° C.) |

Comparative Example 2

| | |
|---|---|
| Melamine/formaldehyde condensate (76%) | 100 parts by weight |
| Sodium dodecylbenzenesulfonate (30%) | 6.3 parts by weight |
| Pentane | 7.6 parts by weight |
| Ammonium chloride | 9.5 parts by weight |
| Formic acid | 2.7 parts by weight |

Ammonium chloride, sodium dodecylbenzenesulfonate, pentane and formic acid were added to a melamine/formaldehyde condensate in the above proportions. 55 g out of the resulting resin composition was placed in a mold of 20×20×2.5 cm and was foamed in an oven of 100° C. In this case, the mold was heated to 100° C. beforehand. The resulting foam had the following properties. Incidentally, the thermal conductivity at 10° C. could not be measured because the foam had cracks and caused breakage.

| | |
|---|---|
| Density | 43.0 kg/m$^3$ |
| Compression stress | 0.32 kgf/cm$^2$ |
| Compression strain | 1.9% |
| Oxygen index | 31% |
| Thermal conductivity | 2.72 × 10$^{-2}$ kcal/mh°C. (25° C.) |
| | 2.90 × 10$^{-2}$ kcal/mh°C. (55° C.) |

EXAMPLE 6

| | |
|---|---|
| Silicon modified melamine/formaldehyde condensate (76%) (KBM 603) | 100 parts by weight 3.8 parts by weight) |
| Sodium dodecylbenzenesulfonate (30%) | 6.3 parts by weight |
| Pentane | 7.6 parts by weight |
| Ammonium chloride | 9.5 parts by weight |
| Formic acid | 2.7 parts by weight |
| CR 200 | 7.6 parts by weight |

Ammonium chloride, sodium dodecylbenzenesulfonate, pentane and formic acid were added to a silicon modified melamine/formaldehyde condensate in the above proportions. Thereto was added CR 200, and the mixture was stirred for about 20 seconds. 55 g out of the resulting resin composition was placed in a mold of 20×20×2.5 cm and was foamed in an oven of 100° C. In this case, the mold was heated to 100° C. beforehand. The resulting foam had the following properties.

| | |
|---|---|
| Density | 45 kg/m$^3$ |
| Compression stress | 1.1 kgf/cm$^2$ |
| Compression strain | 2.7% |
| Oxygen index | 30% |
| Thermal conductivity | 2.66 × 10$^{-2}$ kcal/mh°C. (10° C.) |
| | 2.76 × 10$^{-2}$ kcal/mh°C. (25° C.) |
| | 2.81 × 10$^{-2}$ kcal/mh°C. (55° C.) |

EXAMPLE 7

| | |
|---|---|
| Silicon modified melamine/formaldehyde condensate (76%) (KBM 603) | 100 parts by weight 3.8 parts by weight) |
| Sodium dodecylbenzenesulfonate (30%) | 6.3 parts by weight |
| Pentane | 7.6 parts by weight |
| Ammonium chloride | 9.5 parts by weight |
| Formic acid | 2.7 parts by weight |
| CR 200 | 7.6 parts by weight |

Ammonium chloride, sodium dodecylbenzenesulfonate, pentane and formic acid were added to a silicon modified melamine/formaldehyde condensate in the above proportions. Thereto was added CR 200, and the mixture was stirred for about 20 seconds. 40 g out of the resulting resin composition was placed in a mold of 20×20×2.5 cm and was foamed in an oven of 100° C. In this case, the mold was heated to 100° C. beforehand. The resulting foam had the following properties.

| | |
|---|---|
| Density | 28.5 kg/m$^3$ |
| Compression stress | 0.41 kgf/cm$^2$ |
| Compression strain | 2.9% |
| Oxygen index | 30% |
| Thermal conductivity | 2.55 × 10$^{-2}$ kcal/mh°C. (10° C.) |
| | 2.75 × 10$^{-2}$ kcal/mh°C. (25° C.) |
| | 2.85 × 10$^{-2}$ kcal/mh°C. (55° C.) |

EXAMPLE 8

| | |
|---|---|
| Silicon modified melamine/formaldehyde condensate (76%) (KBM 603) | 100 parts by weight 3.8 parts by weight) |
| Sodium dodecylbenzenesulfonate (30%) | 6.3 parts by weight |
| Pentane | 7.6 parts by weight |
| Ammonium chloride | 9.5 parts by weight |
| Formic acid | 2.7 parts by weight |

-continued

| | |
|---|---|
| CR 200 | 7.6 parts by weight |

Ammonium chloride, sodium dodecylbenzenesulfonate, pentane and formic acid were added to a silicon modified melamine/formaldehyde condensate in the above proportions. Thereto was added CR 200, and the mixture was stirred for about 20 seconds. 50 g out of the resulting resin composition was placed in a mold of 20×20×2.5 cm and was foamed in an oven of 100° C. In this case, the mold was heated to 100° C. beforehand. The resulting foam had the following properties.

| | |
|---|---|
| Density | 40.7 kg/m$^3$ |
| Compression stress | 0.36 kgf/cm$^2$ |
| Compression strain | 2.8% |
| Oxygen index | 30% |
| Thermal conductivity | 2.45 × 10$^{-2}$ kcal/mh°C. (10° C.) |
| | 2.70 × 10$^{-2}$ kcal/mh°C. (25° C.) |
| | 2.83 × 10$^{-2}$ kcal/mh°C. (55° C.) |

Comparative Example 3

| | |
|---|---|
| Melamine/formaldehyde condensate (76%) | 100 parts by weight |
| Sodium dodecylbenzenesulfonate (30%) | 6.3 parts by weight |
| Pentane | 7.6 parts by weight |
| Ammonium chloride | 9.5 parts by weight |
| Formic acid | 2.7 parts by weight |
| CR 200 | 7.6 parts by weight |
| KBM 603 | 2.8 parts by weight |

Ammonium chloride, sodium dodecylbenzenesulfonate, pentane and formic acid were added to a melamine/formaldehyde condensate in the above proportions. Thereto was added CR 200, followed by stirring for about 20 seconds. Thereto was added KBM 603. 45 g out of the resulting resin composition was placed in a mold of 20×20×2.5 cm, and foaming was tried in an oven of 100° C. (In this case, the mold was heated to 100° C. beforehand.) However, the resin composition caused no foaming.

Comparative Example 4

| | |
|---|---|
| Melamine/formaldehyde condensate (76%) | 100 parts by weight |
| Sodium dodecylbenzenesulfonate (30%) | 6.3 parts by weight |
| Pentane | 7.6 parts by weight |
| Ammonium chloride | 9.5 parts by weight |
| Formic acid | 2.7 parts by weight |
| CR 200 | 7.6 parts by weight |
| KBM 403 | 2.8 parts by weight |

Ammonium chloride, sodium dodecylbenzenesulfonate, pentane and formic acid were added to a melamine/formaldehyde condensate in the above proportions. Thereto was added CR 200, followed by stirring for about 20 seconds. Thereto was added KBM 403. 45 g out of the resulting resin composition was placed in a mold of 20×20×2.5 cm, and foaming was tried in an oven of 100° C. (In this case, the mold was heated to 100° C. beforehand.) However, the resin composition caused no foaming.

The melamine resin foam of the present invention is obtained by foaming and curing a mixture of a melamine/formaldehyde condensate, a small amount of an isocyanate and a blowing agent, and is improved in the fragility inherently possessed by melamine resin foams and, as compared with conventional melamine resin foams, gives very small reductions in flame retardancy and thermal conductivity. The melamine resin foam of the present invention obtained by using a silicon modified melamine/formaldehyde condensate in place of a melamine/formaldehyde condensate, has an improved compression stress with other properties remaining about the same as those of the present foam obtained by using a melamine/formaldehyde condensate.

What is claimed is:

1. A process for producing a melamine resin foam, which comprises foaming a resin composition comprising a melamine/formaldehyde condensate wherein the condensate is obtained by synthesis using a silane coupling agent, a blowing agent and an isocyanate having NCO equivalents of 125–500.

2. A process according to claim 1, wherein the content of the silane coupling agent is 0.5–15 parts by weight per 100 parts by weight of the melamine/formaldehyde condensate.

3. A process according to claim 1, wherein the blowing agent is pentane.

4. A process according to claim 1, wherein the content of the isocyanate is 0.5–20 parts by weight per 100 parts by weight of the melamine/formaldehyde condensate.

* * * * *